United States Patent [19]

Kaufman

[11] 4,160,121
[45] Jul. 3, 1979

[54] FREQUENCY SHIFT KEYED TONE GENERATOR

[75] Inventor: Barry M. Kaufman, Pine Brook, N.J.
[73] Assignee: RFL Industries, Inc., Boonton, N.J.
[21] Appl. No.: 756,996
[22] Filed: Jan. 5, 1977
[51] Int. Cl.² .................................. H04B 1/04
[52] U.S. Cl. .................... 178/66 A; 325/163
[58] Field of Search ............... 325/163, 30, 167, 489, 325/490, 145, 148; 178/66 A, 66 R; 331/177, 179

[56] References Cited
U.S. PATENT DOCUMENTS

| | | | |
|---|---|---|---|
| 3,249,896 | 5/1966 | Baker | 331/179 |
| 3,395,351 | 7/1968 | Diese | 325/163 |
| 3,560,881 | 2/1971 | Fredricson | 325/30 |
| 3,729,688 | 4/1973 | Cerny | 331/179 |
| 3,760,301 | 9/1973 | Göransson | 331/179 |
| 3,826,999 | 7/1974 | Williford | 331/179 |
| 3,932,704 | 1/1976 | Bodony | 325/163 |
| 3,997,855 | 12/1976 | Nash | 325/163 |
| 4,039,952 | 8/1977 | Huntley | 325/163 |

*Primary Examiner*—Robert L. Griffin
*Assistant Examiner*—Michael A. Masinick
*Attorney, Agent, or Firm*—Rudolph J. Jurick

[57] ABSTRACT

A frequency shift keyed (FSK) generator producing an output tone frequency which is determined by the output frequency of a digital frequency synthesizer responsive to a control signal. The square wave output of the synthesizer is filtered to a sinewave by an active tracking bandpass filter whose operating frequency is automatically switched to the output frequency of the synthesizer.

1 Claim, 1 Drawing Figure

FREQUENCY SHIFT KEYED TONE GENERATOR

BACKGROUND OF THE INVENTION

Frequency shift keying of an audio tone is a well known method of transmitting data. In general, the tone frequency is generated by an LC or an RC oscillator which produces a relatively clean sinewave and, if the circuit is designed accordingly, amplitude can be made to remain fairly constant and there will be no phase discontinuities. Also, the time delay between keying the oscillator and the time that the frequency actually shifts can be made extremely short. However, there is a limit to the frequency accuracy of an LC or an RC oscillator, particularly with respect to temperature and time.

A quartz crystal controlled oscillator has a very high frequency accuracy and frequency stability versus age and environmental conditions. Crystals operating in the audio frequency range are bulky and expensive, whereas crystals operating in the megahertz range are inexpensive, readily available, small and highly accurate.

In accordance with this invention, a high frequency crystal controlled oscillator is operated continuously and drives a programmable frequency synthesizer whose output is selected for the required tone frequency. Since the data input may be asynchronous, and the digital frequency synthesizer is a zero crossing device, there will be a time error at crystal frequency if the frequency is commanded to shift non-coincident with a zero crossing of the oscillator frequency. However, the state of the art now is such that 5-10 megahertz crystal oscillators are practical using C-MOS logic so that the time error is of the order of a few hundred nano seconds, which is insignificant at the final audio tone frequency. This time error refers to the error between zero crossings at the input of the digital frequency synthesizer. The zero crossings at the output, however, will not necessarily occur simultaneously with a command to shift frequency. Therefore, there can be an asynchronous timing error which for some systems may be substantial. The timing error or asynchronous delay can be $\frac{1}{2}$ cycle of the divider output frequency. If the FSK detection means at the receiving end of the communications channel is responsive only to zero crossings, then the digital frequency synthesizer will not increase the asynchronous timing error above that already generated by the said zero crossing detection means. Theoretically, it is possible by use of a continuous phase FSK demodulator at the receiver to have no asynchronous timing error. However, the output of such a perfect demodulator changes when the rate of change of phase of the incoming signal changes. Continuous phase information over the entire tone frequency cycle is not available from zero crossings alone. Tone generation, transmission and detection of a sinewave is required. Because the crystal frequency is digitally divided down to tone frequency, a squarewave is generated. The use of a continuous phase discriminator at the receiving end would not improve the asynchronous timing error.

The use of a frequency synthesizer to divide a high frequency source down to audio tone frequency is not new. The invention is directed to the solution of problems inherent in such systems. Specifically, a continuous phase signal is generated by processing the output of the digital frequency synthesizer through an active tracking bandpass filter. the rate of change of phase of the output signal changes virtually instantaneously when the circuit is shifted from one frequency to another. Therefore, the combination of digital tone generation and tracking active bandpass filter produces no asynchronous timing error and the signal is suitable for reception at the receiving end of the system by either continuous phase FSK detection means or zero crossing FSK detection means.

SUMMARY OF THE INVENTION

A single high frequency crystal controlled oscillator drives a programmable frequency synthesizer, there being one programming state for each of the FSK frequency states to be generated. The amount of the frequency division is switched to yield the required output tone frequency. The output of the synthesizer is applied to a narrow bandwidth tracking filter providing a continuous phase output signal, the rate of change of phase of the output signal changing virtually instantaneously when the circuit is shifted from one frequency to another.

An object of this invention is the provision of an improved arrangement for generating an FSK tone signal suitable for reception at the receiving end of a communications channel by either continuous phase FSK detection means or by zero crossing FSK detection means.

An object of this invention is the provision of an FSK tone generator having crystal controlled frequency stability and tolerance, and virtually no time delay between the command to shift frequency and the time when the output frequency actually changes.

An object of this invention is the provision of an FSK tone generator providing a pure sinewave output with no change in amplitude and no discontinuity of phase when frequency is shifted.

An object of this invention is the provision of an FSK tone generator in which the frequency of a crystal controlled oscillator is programmably divided down to audio tone frequencies by a digital frequency synthesizer whose output is processed by a tracking active bandpass filter to provide a sinewave output.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

The single FIGURE of the drawing is a schematic circuit diagram of a 2-frequency, FSK tone generator made in accordance with this invention.

DESCRIPTION OF PREFERRED EMBODIMENT

Figure 1:
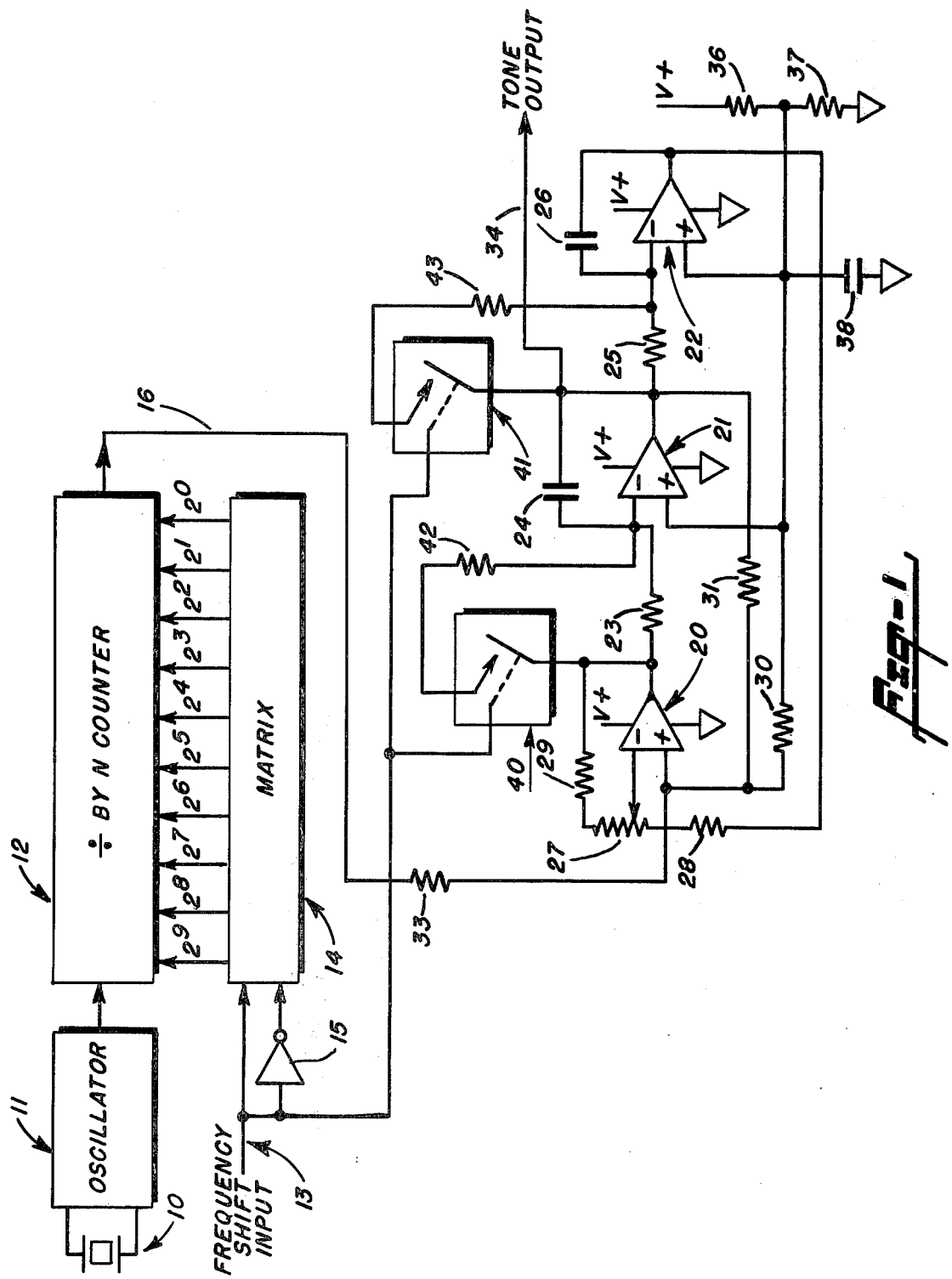

Reference now is made to the drawing which illustrates a circuit that shifts between two frequencies. Crystal 10 and oscillator circuit 11 form a conventional single frequency crystal controlled oscillator which, typically, would operate in the megahertz range when the output tone frequency of the generator is to be in the audio range. The oscillator drives a conventional divide by N frequency counter 12, where N is an integer. The integer that the counter will divide by is controlled by logic voltage fed to the programmable inputs. As an example in this case, ten programmable inputs are shown and the binary number of $2^0$ through $2^9$, which is 1024 combinations, controls the division denominator. The frequency shift command signal is applied to input lead 13. When a logic (1) is applied, the frequency of the system is commanded to shift high, and with a logic (0) frequency is commanded to shift low. The input signal is applied directly to a matrix 14. Also applied to the matrix is the complement of the input signal produced by the inverter 15. The matrix may be a conventional diode matrix, logic gates configured in a matrix, a read only memory or any device which will convert logic inputs into a corresponding parallel output binary number. When a logic (1) is applied to the frequency shift input, matrix 14 will program the counter 12 for the highest of the two frequencies which is the lowest of the two binary numbers. When the frequency shift input is switched to logic (0), the matrix will program the counter to put out the lowest of the two frequencies. The output of the counter appears on the line 16, such output having a waveform which is two state and rectangular.

The output from the counter 12 drives a tracking active bandpass filter which consists of operational amplifiers 20, 21 and 22 along with associated components. The amplifier 20 operates as an inverting amplifier, whereas the amplifiers 21 and 22 each operate as an integrator. The resonant frequency of operation is controlled by the time constants of the two integrators 21 and 22. The time constant of integrator 21 is determined by the resistor 23, (between the output of amplifier 20 and the inverting input of integrator 21) and capacitor 24. The time constant of integrator 22 is determined by the resistor 25, (between the output of integrator 21 and the inverting input of integrator 22) and capacitor 26. The resonant frequency of this filter is also determined by the inverting gain of amplifier 20, which gain is controlled by resistors 27, 28 and 29. The resistor 27 is a frequency trim control and has no effect on the output frequency which, of course, is crystal controlled. Its purpose is to bring the resonant frequency of the active filter approximately into coincidence with operating frequency, the procedure of adjustment being to peak the amplitude of the output. If the bandpass filter operates with an appropriate Q, a frequency inaccuracy of a few tenths of a percent would have no significant detrimental effect. The Q of this active filter is controlled by resistors 30 and 31. The output of the digital frequency counter 12 is injected into the bandpass filter through resistor 33. The generator's tone output is taken from the output of amplifier 21 and appears on the lead 34. Resistors 36 and 37 bias the operational amplifiers for linear mode of operation and capacitor 38 by-passes the bias line.

The operating frequency of the filter is determined by the input resistors to integrators 21 and 22. The filter operates on its lowest frequency when field effect transistor switches 40 and 41 are turned off. In this case the only input path to the integrators are via resistors 23 and 25. If switches 40 and 41 are turned on, then resistor 42 will be paralleled across resistor 23 and resistor 43 will be paralleled across resistor 25. The resonant frequency of the bandpass filter will be raised.

If the shift input is driven to program the circuit for lowest frequency operation the matrix 14 will program the counter 12 so that its output will be at a first desired operating tone frequency. The bandpass filter will be switched to this frequency because the switches 40 and 41 will be turned off. If the shift input is driven to program the circuit for higher frequency operation, the matrix will program the counter so that its output will be at a second desired frequency. The bandpass filter will be switched to this frequency because the switches 40 and 41 will be turned on.

The output of the counter 12 consists of a pulse or a square wave. Such output, being rich in harmonics, is not suitable for transmission over a telephone line or other voice grade communications circuits. A sinewave of high purity is required and the purer the sinewave the less will be the interference to other communications signals sharing the transmission path.

The output of the counter can be followed by a low pass filter or conventional bandpass filter which would pass the fundamental and strip off the harmonics. However, an important feature of my frequency shifted tone generator is that the time delay between when the circuit is commanded to shift frequency and when the output signal actually changes frequency is extremely short. A low pass filter or a bandpass filter would have, along with the desirable effect of purifying the waveform, the undesirable effect of creating time delay. Any filter having a finite bandwidth gives a time delay and the delay becomes greater as the bandwidth is decreased. A narrow bandwidth with resultant unacceptable time delay is required to achieve the desired sinewave purity.

A feature of this invention is to purify the output of a digitally divided tone frequency originally derived from a crystal controlled oscillator, by a narrow bandwidth tracking bandpass filter. A bandpass filter or resonator if selective to only the fundamental tone frequency, will suppress the undesired harmonic frequencies. Thus, the resultant output is a sinewave whose purity is a function of the filter bandwidth. The narrower the bandwidth the higher the rejection.

The basic filter chosen for this particular application is the so-called bi-quad or state variable bandpass filter. This filter, consisting of two operational amplifier integrators for an operational amplifier connected as an inverter, is noted for its low sensitivity to Q or frequency variation versus component value changes. Very high and stable Q's can be developed within the audio frequency range. The filter has the same transfer function as a single L-C resonator. The resonant frequency of this active filter may be instantaneously changed by varying resistors within the circuit. When resistors are varied, there is no change in stored energy as there would be by varying a reactive component. The effect is that when the resistors are changed, the filter is instantaneously shifted from one frequency to another with at that instant no amplitude or phase discontinuity.

The tracking bandpass filter being of high Q acts like a fly wheel. The fly wheel effect is continuously pumped by the tone output of the digital frequency counter. Therefore, the output frequency of the filter will be that of the programmable frequency counter which, in turn, is crystal controlled. Since the filter is tuned approximately to the tone frequency, its output zero crossings will coincide closely with zero crossings at the output of the digital frequency counter. Suppose as an example, the circuit is commanded to shift frequency but the command is made in time half way between zero crossings of the divider output. The command not only shifts the synthesizer frequency but, also, changes the frequency of the tracking bandpass filter as well. The energy state of the filter is not changed at that instant, only the rate of change of phase. The tracking active bandpass filter therefore furnishes frequency change information to the communications circuit even though such information, at that instant, did not appear at the output of the digital frequency divider. Even though the frequency was changed, the next zero crossing of the divider output and the output of the tracking bandpass filter will coincide because both the divider input frequency and the bandpass filter frequency were correspondingly and simultaneously changed.

The illustrated and described tone generator shifts between two frequencies. It will be apparent, however, that any number of frequencies could be generated by adding additional control logic to the frequency synthesizer and additional analog switches and frequency changing resistors to the tracking bandpass filter. Also, the analog switches could be any type of electronic switch, such as, transistor, optically-coupled isolator, etc.. Further, although the so-called bi-quad or state variable filter has been chosen for illustration, many other types of tracking bandpass filters would be appropriate.

Having now described the invention what I desire to protect by letters patent is set forth in the following claims.

I claim:

1. A frequency shift keyed tone generator for providing an output tone frequency in response to an applied control signal, said generator comprising,
   a—a digital frequency synthesizer whose output is programmable to any one of a plurality of tone frequencies in respose to said control signal,
   b—a tracking active bandpass filter driven by the output of the synthesizer and comprising a pair of operational integrators each having a resistor establishing the time constant thereof, and an operational phase inverter, said integrators and said inverter being connected in a feedback loop and the operating frequency of the filter being controlled by the time constants of said integrators,
   c—third and fourth resistors,
   d—a first switch controlling the connection of said third resistor to the resistor of one of said pair of integrators to change the time constant thereof,
   e—a second switch controlling the connection of said fourth resistor to the resistor of the other of said pair of integrators to change the time constant thereof, and
   f—means applying the said control signal simultaneously to the first and second switches, the arrangement being such that the operating frequency of the filter corresponds to the output frequency of said synthesizer.

* * * * *